Jan. 28, 1936.   H. N. ATWOOD   2,029,213
HONEYCOMB CONSTRUCTION FOR AIRCRAFT
Filed Sept. 14, 1934
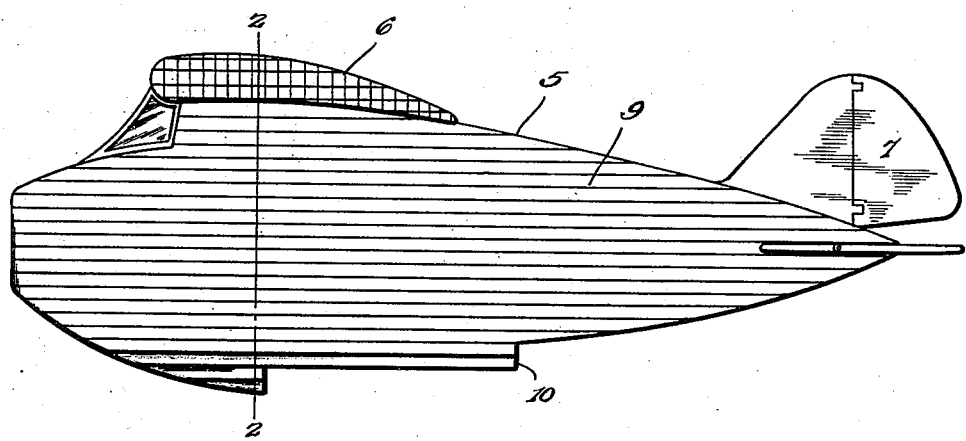
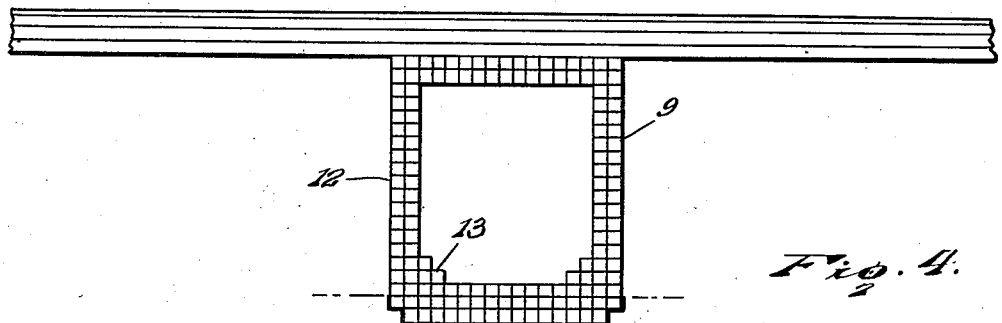
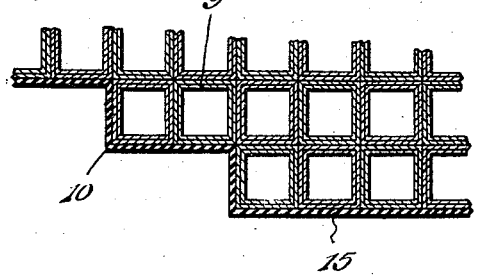
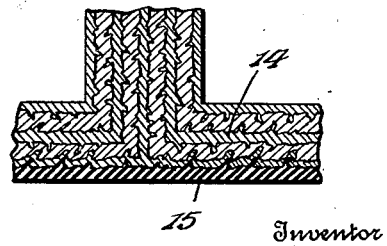
Inventor
Harry N. Atwood.
By Lacey & Lacey, Attorneys Patented Jan. 28, 1936

2,029,213

UNITED STATES PATENT OFFICE 2,029,213

HONEYCOMB CONSTRUCTION FOR AIRCRAFT

Harry N. Atwood, South Lyndeboro, N. H.

Application September 14, 1934, Serial No. 744,069

2 Claims. (Cl. 244—30)

This invention relates to hydro-airplanes and other aircraft, and more particularly to the construction of the body and wings thereof.

The object of the invention is to provide a hydro-airplane, the boat body and sustaining wings of which are of cellular or honeycomb construction, thereby decreasing the weight of the plane, while at the same time increasing its strength, stability and resistance to tortional strains and stresses.

A further object of the invention is to provide an aircraft formed of laminated tubular members, each constructed of strips of natural wood or other fibrous material wound in superposed spiral layers and impregnated with an acetone solution containing cellulosic plastic material, said tubular members being assembled to conform to the shape or contour of a selected hydro-airplane with their adjacent faces in intimate bonding contact with each other to form an integral built-up honeycomb structure.

A further object of the invention is to provide a hydro-airplane, the water contacting surface of which decreases in proportion to the rate of speed or lifting power of the plane, thereby offering less frictional surface resistance to the water and, consequently, enabling the pilot to make a quicker take-off than heretofore.

A further object is to provide the hermetically sealed tubular members at the bottom of the boat body with a moisture proof surfacing material and to arrange said tubular members in step formation both longitudinally and transversely of the hydro-airplane so as to present water contacting surfaces of progressively decreasing areas.

In the accompanying drawing forming a part of this specification and in which similar numerals of reference indicate corresponding parts in all the figures of the drawing:

Figure 1 is a side elevation of a hydro-airplane constructed in accordance with the present invention.

Figure 2 is a vertical sectional view, taken on the line 2—2 of Figure 1.

Figure 3 is an enlarged detail sectional view showing how the tubular members are assembled.

Figure 4 is a similar view showing the bonding action between said tubular members.

In the accompanying drawing, 5 designates the boat body which may be of any desired length, height, width and surface contour, 6 the sustaining wings and 7 the rudder, the propeller being omitted for sake of clearness.

In accordance with the present invention, I propose to construct the boat body and wings of independent laminated tubular members 9 arranged side by side in bonding contact with each other so as to form an integral reinforced honeycomb structure, thereby rendering the plane light in weight, while at the same time giving it the desired strength and stability necessary to resist tortional and tensile strains when in flight or incident to making a take-off or landing. The tubular members 9 are each preferably formed of a strip or strips of natural wood veneer or other fibrous material impregnated with an acetone solution containing a small percentage of cellulosic plastic material such as cellulose acetate, nitrate or cellulose ester. These impregnated strips are then wound in superposed spiral layers over a suitable shaping mandrel to form laminated tubes of the desired length. In fabricating the boat body, the laminated tubes are sprayed, coated or otherwise covered with the acetone solution and while the exterior surfaces of the tubes are still moist or wet said tubes are placed on suitable finishing mandrels and then assembled in superposed relation in the shape of a selected style or type of boat body or fuselage with adjacent tubes in intimate bonding contact with each other to form inner and outer walls and the structure thus formed subjected to heat and pressure. The wings 6 are fabricated in like manner and intimately connected with and bonded to the boat outer walls of the body or fuselage. The tubes at the bottom of the boat body 5 are preferably hermetically sealed and stepped longitudinally, as indicated at 10, and in assembling the tubular members constituting said bottom, the tubes are also stepped transversely, as indicated at 11 in Figure 2, so that the bottom of the body or fuselage is stepped both longitudinally and transversely. By constructing the bottom of the boat body in this manner the effective water contacting surface of said bottom decreases in proportion to the rate of speed or lifting power of the plane, thereby offering less frictional resistance to the surface of the water and, consequently, enabling the pilot to make a quicker and safer take-off and landing than heretofore. The bottom of the aircraft at its junction with the side walls 12 of the boat body is preferably reinforced and strengthened by the provision of auxiliary stepped tubes 13 which are bonded to the inner tubular members of the side walls and bottom and to each other in the manner previously set forth.

By reference to Figure 4 of the drawing it will be noted that the cellulosic plastic material 14 impregnates and fills the pores and interstices of the wood veneer so as to insure an effective bond between the parts and thus form, in effect, an integral honeycomb structure capable of effectively resisting crushing, as well as disruptive strains and as the boat body and wings are of cellular construction the weight of the plane is materially decreased. By using a cellulosic plastic material which has been dissolved in acetate to form an acetone solution, the acetate can be removed by a process of evaporation, leaving the cellulosic plastic material in its original chemical structure. Therefore, the cellulosic plastic material can be specifically applied again and again, layer upon layer upon the cellulosic plastic surfaces of the tubular members or the exterior surfaces of the body and wing assembly so as to cover and reinforce the plastic surfaces thereof with a like chemical structure and the parts welded and integrated together into one homogeneous cellulosic plastic structure by the mere application of heat and without liability of charcoaling or carmeling the wood veneer or other fibrous reinforcing material of which the tubular members are constructed and, consequently, without reducing the inherent strength of said reinforcing material. Moreover, as the cellulosic plastic material can be softened by heat without changing its chemical characteristics, it follows that two or more of the tubular members may be chemically welded and bonded to each other and to adjacent tubular members and when solidified, the plastic will form a hard glass-like surface which may be reinforced and strengthened whenever necessary or desired by additional plastic material and heat treatments. This is particularly desirable in airplane construction as should the sustaining wings, body or other structural part of the plane become broken or otherwise damaged, the damaged area can be quickly and easily repaired by the application of additional coats of cellulosic plastic material or layers of plastic impregnated wood veneer and heat treatments and this reinforcement may be readily accomplished particularly where the tubular members constituting the assembly are coated with cellulosic plastic material.

It is preferred to provide the tubular members constituting the bottom of the boat body with an exterior coating or layer of water and moisture proof material such as rubber, as indicated at 15 in Figure 3 of the drawing and this rubber coating is intimately combined with and bonded to the tubes so as to constitute an integral part thereof.

It will be understood that aircraft of any type, design or shape may be fabricated in accordance with the present invention and it is, therefore, not desired to limit the invention in this respect. It will also be understood that the exterior of the boat body and wings may be sprayed or otherwise coated with cellulosic plastic material to provide a smooth protective jacket or finish therefor and this protective material adheres to and combines with the cellulosic plastic material already incorporated in the wood veneer so as to become an integral part thereof and not a mere superficial paint or coating which is foreign to the body element and tends to scale or peel off by friction due to wind belocity and water and air conditions.

Having thus described the invention, what is claimed as new is:

1. An aircraft comprising a body and wing assembly, the body being hollow and constructed of longitudinal tubular members disposed side by side in intimate bonding contact with each other to form walls of inner and outer tubular members, and the wing being formed entirely of superposed longitudinally disposed tubular members arranged at substantially right angles to the longitudinal tubular members of the body and bonded to each other and to the tubular members constituting the walls of said body to form a homogeneous structure.

2. An aircraft including a homogeneous body and wing structure, the body being hollow and constructed of longitudinal tubular members disposed side by side in intimate bonding contact with each other to form inner and outer walls at the top, sides and bottom of said body, the wing being formed entirely of superposed longitudinally disposed tubular members arranged at substantially right angles to the longitudinal tubular members constituting the body and bonded to each other and to the tubular members at the top of said body.

HARRY N. ATWOOD.